(12) United States Patent
Kuckhoff et al.

(10) Patent No.: US 11,835,093 B2
(45) Date of Patent: Dec. 5, 2023

(54) CLAMP COLLAR

(71) Applicant: Dodge Industrial, Inc., Oxford, CT (US)

(72) Inventors: Thomas E. Kuckhoff, Greenville, SC (US); James G. Saxon, Russellville, TN (US)

(73) Assignee: Dodge Industrial, Inc., Oxford, CT (US)

( * ) Notice: Subject to any disclaimer, the term of this patent is extended or adjusted under 35 U.S.C. 154(b) by 378 days.

(21) Appl. No.: 16/991,801

(22) Filed: Aug. 12, 2020

(65) Prior Publication Data
US 2022/0049742 A1  Feb. 17, 2022

(51) Int. Cl.
*F16C 35/063* (2006.01)
*F16C 43/04* (2006.01)
*F16C 33/58* (2006.01)

(52) U.S. Cl.
CPC .......... *F16C 35/063* (2013.01); *F16C 33/586* (2013.01); *F16C 43/04* (2013.01); *F16C 2226/10* (2013.01); *F16C 2226/60* (2013.01)

(58) Field of Classification Search
CPC ...... F16C 19/06; F16C 33/586; F16C 35/047; F16C 35/063; F16C 35/073; F16C 35/12; F16C 43/04; F16C 2226/10; F16C 2226/60
See application file for complete search history.

(56) References Cited

U.S. PATENT DOCUMENTS

| | | | |
|---|---|---|---|
| 2,092,985 A * | 9/1937 | Okner | F16C 35/073 403/370 |
| 4,403,814 A * | 9/1983 | Koss | F16D 1/0847 384/541 |
| 5,417,500 A | 5/1995 | Martinie | |
| 9,822,818 B1 * | 11/2017 | Hewitt | F16C 35/063 |

* cited by examiner

*Primary Examiner* — Alan B Waits
(74) *Attorney, Agent, or Firm* — Ruggiero McAllister & McMahon LLC

(57) ABSTRACT

A bearing assembly is disclosed, comprising: an outer race and a plurality of rolling elements associated with the outer race. An inner race adapted to receive a shaft therein is rotatably disposed within the outer race such that the plurality of rolling elements are disposed between the inner and outer races. A cylindrical extension forming a plurality of tabs symmetrically arranged around the entire periphery of the extension is adapted to engage the shaft. A clamp collar that is installable around the cylindrical extension is defined by a circular wall with at least one threaded opening extending through the circular wall. The threaded member extends through one of the threaded openings to make contact with and apply a biasing force on one of the plurality of tabs towards the shaft when the shaft is disposed in the inner race to secure the inner race on the shaft.

17 Claims, 8 Drawing Sheets

CLAMP COLLAR

TECHNICAL FIELD

This patent disclosure relates generally to industrial machines incorporating a bearing assembly and, more particularly, to a clamp collar.

BACKGROUND

Bearing assemblies support rotating shafts. By supporting rotating shafts, bearings allow rotating mechanical energy to be transmitted. For rolling element bearings to support the shaft loading, the bearing must be affixed to the circular shaft to allow the shaft rotation to be supported by the bearing rolling elements without sliding between the bearing assembly and the shaft, which can cause bearing failure. Typical bearing shaft attachments include an inner ring of the bearing, or a ring that is composed of the inner raceway of the bearing. Regardless of how the attachment is made between the inner bearing ring and the shaft, the methodology must accommodate the load requirements of the application as well as ease of installation and removal.

One industry standard bearing shaft attachment includes use of setscrews, which thread through the inner ring and engage the shaft directly. Such connection structures often damage the shaft, where localized marring of the shaft material is caused by the tip of the setscrew, but are nonetheless widely used because they can achieve high bearing holding power on the shaft. This increased holding power is required for bearings that experience high loading. Shaft damage is a result of the setscrews passing through bearing rigid collars and inner rings to deform the surface of the shaft through high torque values on the setscrews. This deformation of the shaft creates obstacles when removing the bearing as the inner rings cannot easily pass over the deformed material of the shaft, which often results in the entire bearing assembly being thrown away if one bearing fails or the entire assembly requires hydraulic assistance to remove the failed bearing, which can increase downtime, cost and complexity for many applications. A common solution to attach a bearing without damaging the shaft is by using a clamp collar and a flexible inner ring design, which has a reduced shaft holding power relative to setscrews for some applications. The clamp collar uses one or two bolts that connect sections of the collar together, which upon tightening acts as a clamp to tighten the collar onto the flexible inner ring of the bearing which in turn tightens on the shaft. Much like a hose clamp operates, the collar has a C-shape that closes around the flexible collar as the bolt tightens. Because the flexible collar design is susceptible to the limited torque applied to the clamp collar bolt, holding power efficiency losses can result due to elastic deformation of the clamp collar. Therefore, shafts that are free of damage and bearings with high shaft holding power are currently mutually exclusive design options, and both present their own set of problems.

BRIEF SUMMARY

The disclosure provides a bearing assembly with a threaded member shaft clamp collar for uniform shaft holding pressure. The bearing assembly includes an outer race and a plurality of rolling elements associated with the outer race. An inner race is rotatably disposed within the outer race such that the plurality of rolling elements which are disposed between the inner and outer races. The inner race adapted to receive therein a shaft and includes a cylindrical extension forming a plurality of tabs symmetrically arranged around an entire periphery of the cylindrical extension. The cylindrical extension is adapted to engage the shaft. Additionally, the bearing assembly includes a clamp collar having a generally annular shape defined by a circular wall. The circular wall has a thickness in an axial direction, a height in a radial direction, and a clamp collar gap extending radially through the circular wall. The clamp collar gap has a clamp collar gap thickness that is tangential to the circular wall. The clamp collar has at least one threaded opening extending radially through the height of the circular wall. The threaded opening has inner and outer openings defined on the circular wall. A threaded member can threadably engage within at least one threaded opening and extend through the at least one threaded opening. The threaded member is configured to abuttably and releasably contact a tab from the plurality of tabs. Further, the clamp collar is installable on and around the cylindrical extension such that the threaded member applies a biasing force on one of the plurality of tabs in the radial direction towards the shaft when the shaft is disposed in the inner race to secure the inner race on the shaft in both the radial and axial directions. A possible advantage of the bearing assembly of this disclosure is that the biasing force applied by the threaded member on one of the plurality of tabs places the centerline of the shaft closer to being collinear with the centerline of the inner race thereby decreasing the vibration of the bearing assembly during operation. This and other possible advantages and features will be apparent from the following detailed description and accompanying drawings.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Figure 1:
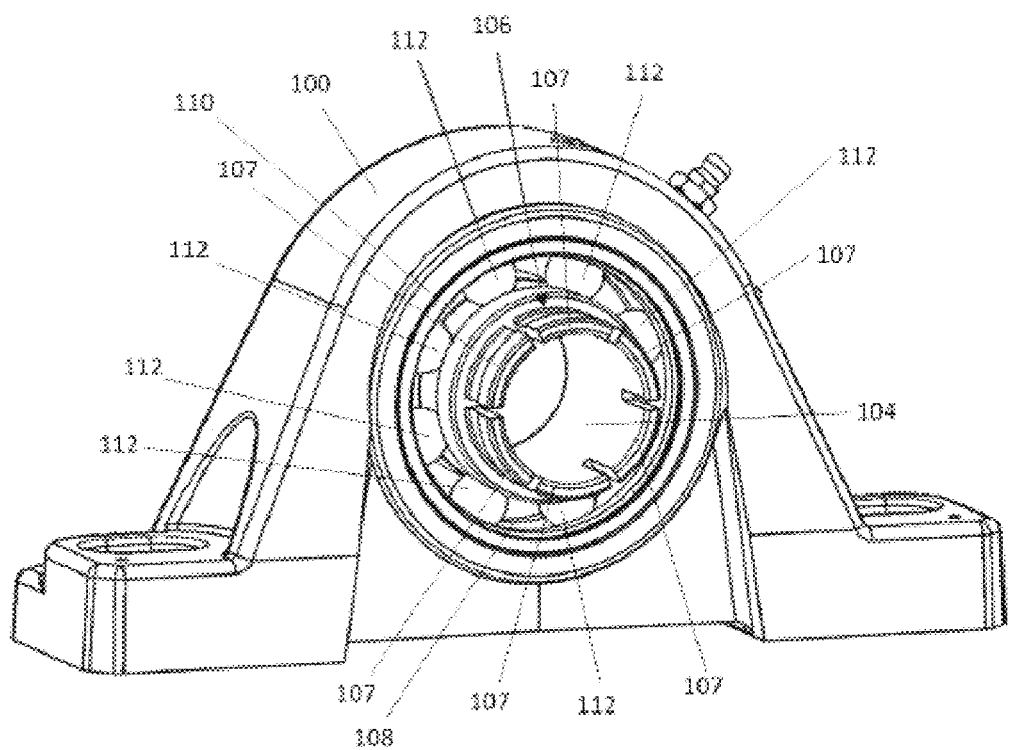
FIG. 1 is a perspective view of a bearing assembly with a clamp collar removed, according to aspects of the present disclosure.
Figure 3:
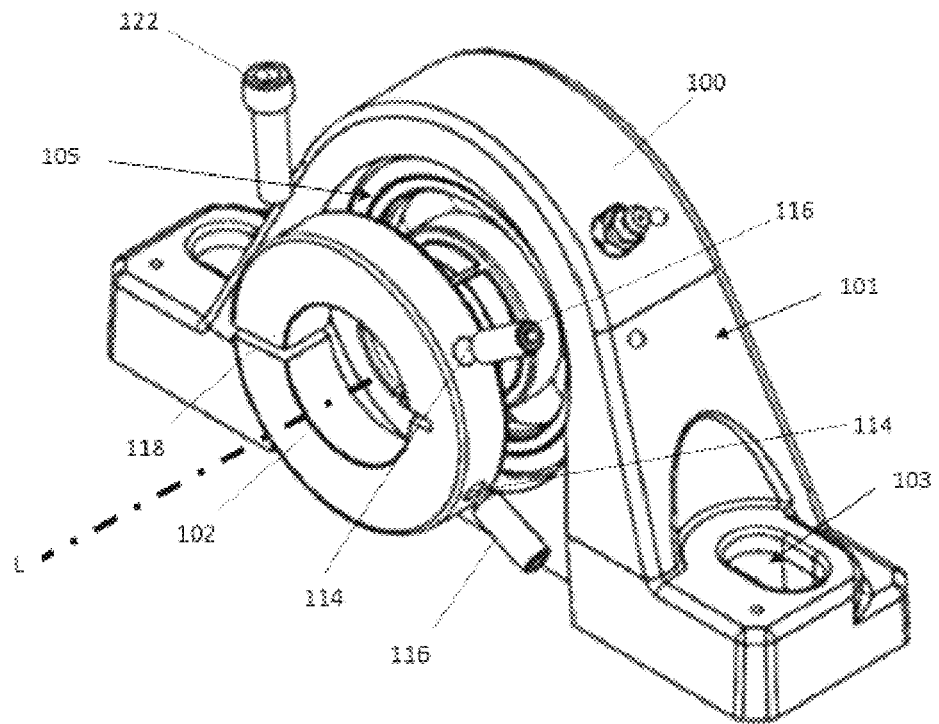
FIG. 3 is a partially exploded view in perspective of one embodiment of a bearing assembly according to aspects of the present disclosure.

Now referring to the drawings, wherein like reference numbers refer to like elements, there is illustrated in FIG. 1 a perspective view of a bearing assembly 100 without a clamp collar installed. The bearing assembly 100, which is also shown in FIG. 3, includes a base 101, which in the illustrated embodiment includes fastener openings 103 for attaching to a base structure (not shown). The base 101 is a two-piece bracket that supports a roller bearing 105. The roller bearing 105 includes an outer race 108, an inner race 110, and a plurality of rolling elements 112 disposed between the outer race 108 and the inner race 110. The inner race 110 is rotatably disposed within the outer race 108 by use of a plurality of rolling elements 112, which is disposed between the inner race 110 and outer race 108, thereby allowing the inner race 110 to rotate within the outer race 108 as the plurality of rolling elements 112 rotates between the inner race 110 and outer race 108. The plurality of rolling elements 112 is symmetrically arranged between the inner race 110 and outer race 108. In typical applications bearing retainers can also be used (not shown) to retain the spaced relation between the rolling elements around the periphery of the inner race 110 and outer race 108.

The inner race 110 includes a cylindrical extension 104 that forms a plurality of tabs 106. The plurality of tabs 106 includes tabs 107 as depicted in FIG. 1. The tabs 107 are symmetrically arranged around the entire periphery of the cylindrical extension 104 and extend axially over a distance along a longitudinal axis of the shaft. The tabs 107 of the plurality of tabs 106 extend equally over respective segments of an inner periphery of the cylindrical extension 104. In an embodiment, the plurality of tabs 106 is formed on one end of the cylindrical extension 104. In another embodiment, the plurality of tabs 106 can also be formed at both ends of the cylindrical extension 104. In yet another embodiment, one or more tabs 107 of the plurality of the tabs 106 is/are flexible. Additionally, the cylindrical extension 104 is adapted to engage a shaft through the axial direction.

Figure 2:
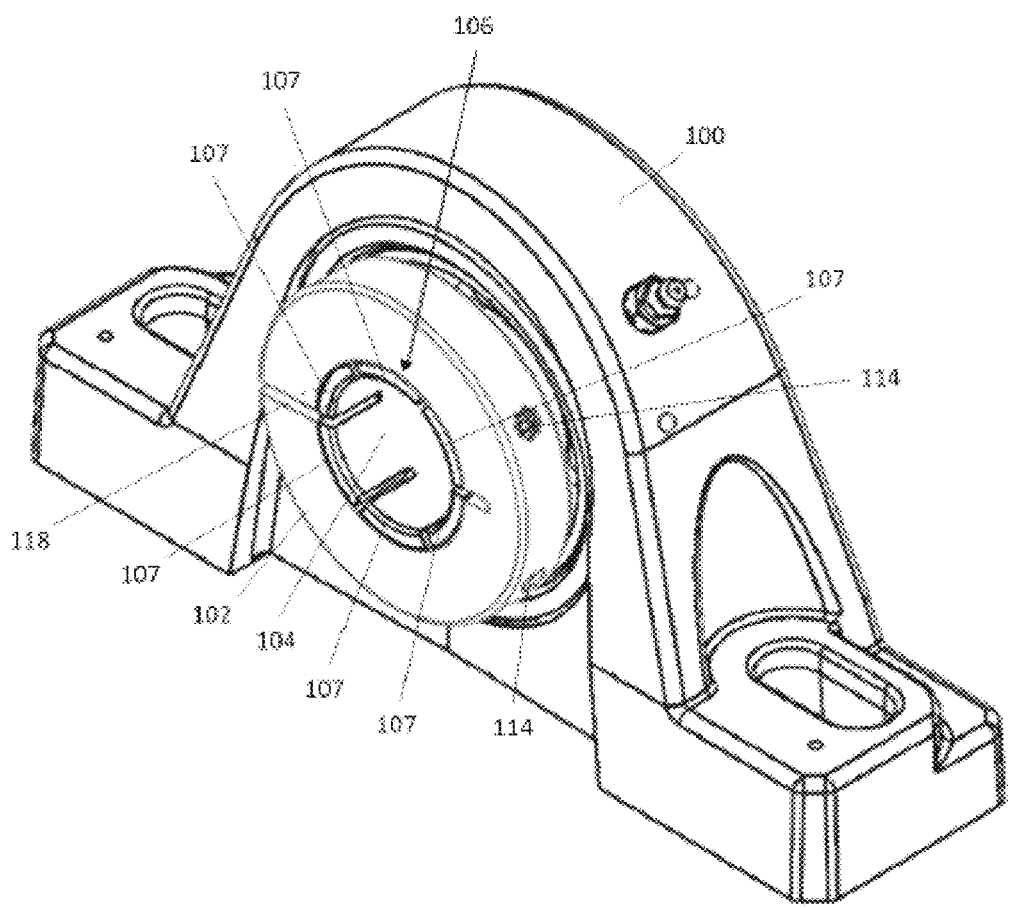
FIG. 2 is a perspective view of a bearing assembly with a clamp collar installed, according to aspects of the present disclosure.

Referring to FIG. 2, there is illustrated a perspective view of a bearing assembly 100 with a clamp collar 102 installed. The clamp collar 102 has a generally annular shape defined by a circular wall 126 that has an inner and outer circumference in a radial direction. The circular wall 126 has a thickness in an axial direction, e.g., along a longitudinal axis (L) of the shaft on which it is installed (shaft not shown), a height in a radial direction, which is perpendicular to the longitudinal axis L, and a clamp collar gap 118 extending radially through the circular wall. The clamp collar gap 118 extends radially through the wall such that the circular wall is generally C shaped. For example, the clamp collar may have an outer radius of 10 cm on its outer circumference and an inner radius of 9 cm on its inner circumference. Therefore, the height of the circular wall of the clamp collar 102 in the axial direction along the longitudinal axis L, as well as the radial length of the clamp collar gap 118, would be 1 cm. In the same example, the thickness of the circular wall of the clamp collar 102 in the longitudinal direction may also be 1 cm, such that the circular wall gas a generally square cross-section, and the clamp collar gap 118 may have a clamp collar gap thickness of 0.5 cm. This is just an example and other dimensions for the clamp collar 102 and clamp collar gap 118 are also envisioned and may be selected based on the overall shape and size of the bearing 105.

As depicted in FIG. 2, the clamp collar 102 is installable on and around the cylindrical extension 104. The clamp collar 102 also has at least one threaded opening 114 that extends radially through the height of the circular wall of the clamp collar 102. The threaded opening 114 extends through the circular wall 126 and includes an inner and outer opening as defined by the height of the circular wall of the clamp collar 102. The outer opening of the threaded opening 114 extends through the surface of the outer circumference of the circular wall and the inner opening extends through the surface of the inner circumference of the circular wall. In an embodiment, there are more than one threaded opening 114 formed through the clamp collar 102, in which case the openings 114 can be symmetrically spaced around the circular wall of the of the clamp collar 102. For example, there may be two, three, or four threaded openings 114 that are spaced at 180-, 120-, or 90-degrees respectively from each other on the circular wall of the clamp collar 102. In other embodiments, there can be more than four or fewer than one threaded openings 114 that are symmetrically spaced around the circular wall of the clamp collar 102. A position of each threaded opening 114 may also depend on a location of the clamp collar gap 118 such that the threaded opening(s) 114 are symmetrically distributed about a diameter of the clamp collar 102 that includes the clamp collar gap 118 and are symmetrically arranged at radial locations that are generally opposite the clamp collar gap 118.

Referring to FIG. 3, there is illustrated a partially exploded view of an embodiment of a bearing assembly 100 with the clamp collar 102 removed from the bearing assembly 100 for clarity. The circular wall of the clamp collar 102 has two threaded openings 114 with two respective threaded members 116. Additionally, there is a clamp collar gap 118 in the clamp collar 102 and a clamp collar bolt 120 associated with the clamp collar 102. In an embodiment, the threaded openings 114 are symmetrically spaced around the clamp collar 102 in an area opposite the clamp collar gap 118 and clamp collar bolt 120, as depicted in FIG. 3. In this embodiment, the threaded openings 114 are disposed at +135 degrees and at −135 degrees from the location of the collar gap 118 such that they form an angle of 90 degrees between them.

Figure 4:
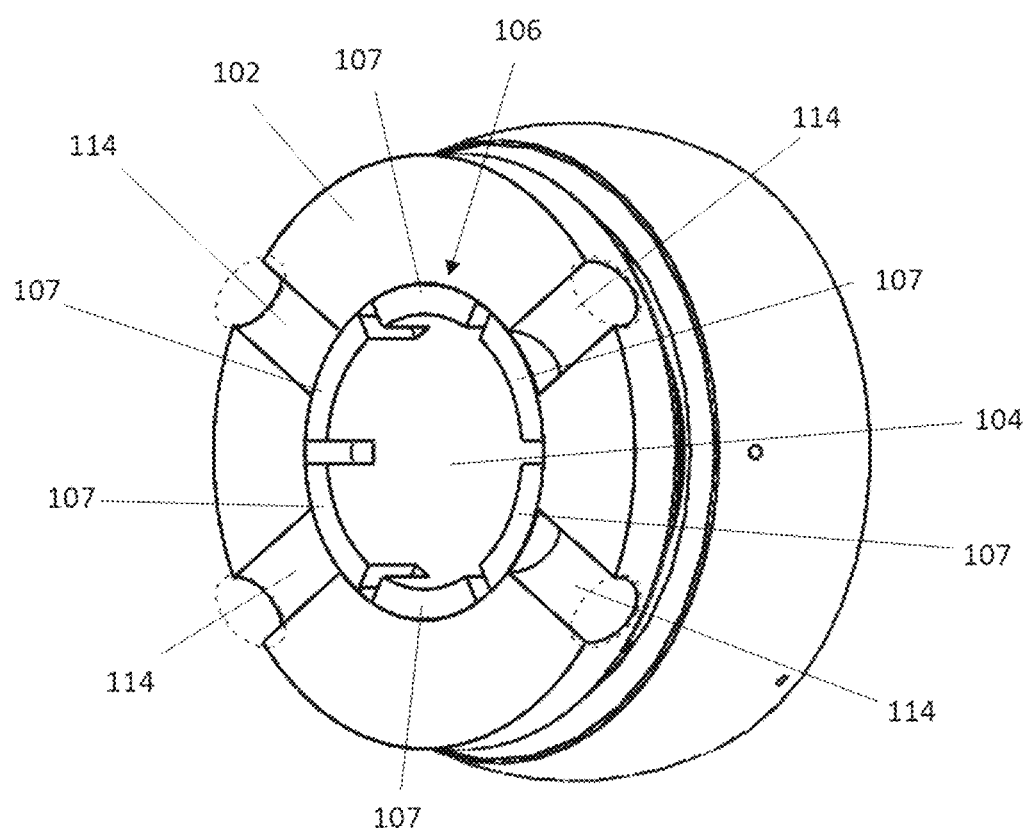
FIG. 4 is a cross section view of a clamp collar according to aspects of the present disclosure.

Referring to FIG. 4, there is illustrated a cross section view of a clamp collar 102. The clamp collar 102 in this embodiment differs from the clamp collar 102 shown in previous embodiments in that it omits the gap 118. The clamp collar 102 shown here completely surrounds the cylindrical extension 104 and has an inner diameter that clears the plurality of tabs 106 during installation. The plurality of tabs 106 is formed such that the individual tabs 107 are symmetrically arranged around the entire periphery of the cylindrical extension 104. Each tab 107 from the plurality of tabs 106 extends equally over a segment of the inner periphery of the cylindrical extension 104. In this embodiment, four threaded openings 114 are symmetrically spaced around the clamp collar 102 (e.g., there is a threaded opening 114 spaced at 90 degree intervals around the circular wall of the clamp collar 102). Each threaded opening 114 extends through the height of the circular wall of the clamp collar 102 so that a threaded member 116 (not shown in FIG. 4) extends through each threaded opening 114 to abuttably and releasably contact a respective one of the plurality of tabs 106.

Figure 5:
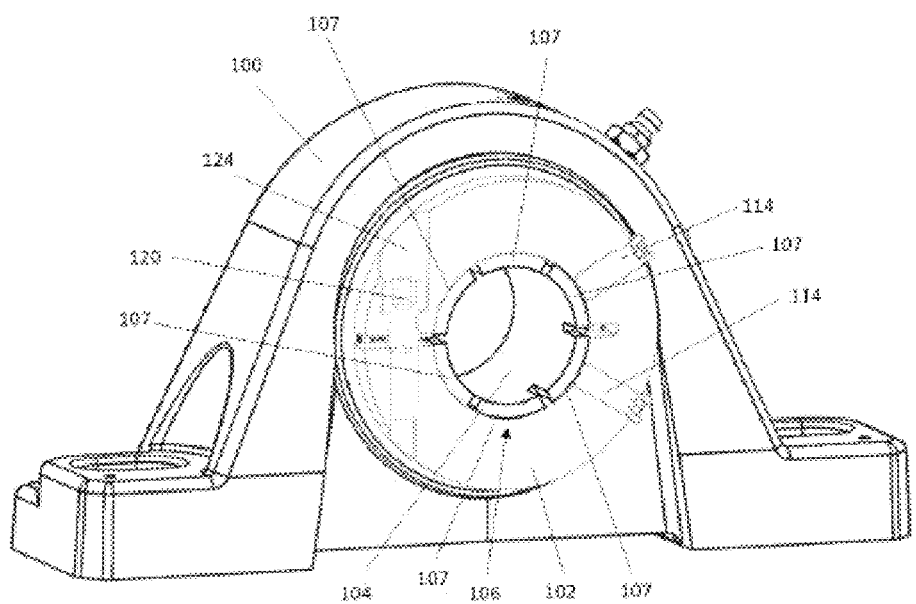
FIG. 5 is a partial cross section view of a bearing assembly according to aspects of the present disclosure.
Figure 6:
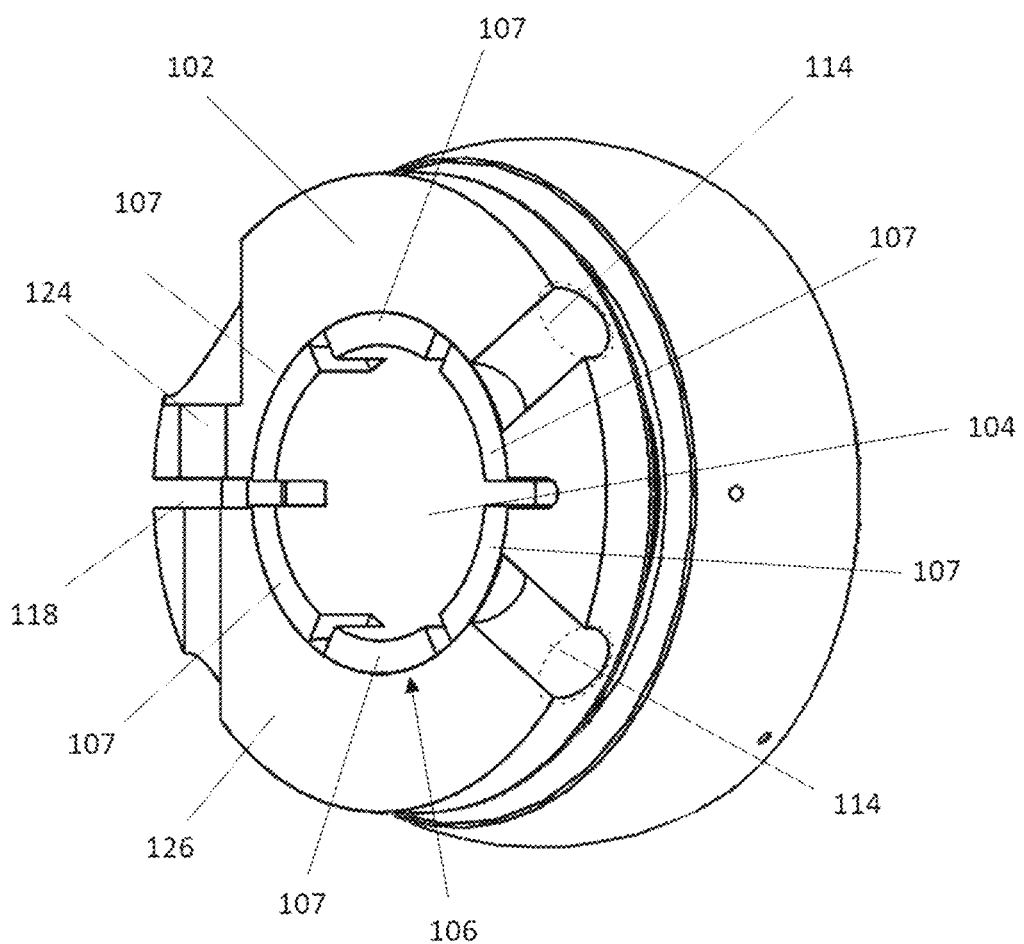
FIG. 6 is a cross section view of an alternative embodiment of a clamp collar according to aspects of the present disclosure.

Referring to FIGS. 5 and 6, there is illustrated a partial cross section view of a bearing assembly 100 with a clamp collar bolt threaded opening 124 and a cross section view of an alternative embodiment of a clamp collar 102 with a clamp collar bolt threaded opening 124 respectively. The clamp collar bolt threaded opening 124 extends tangentially through an inner opening of the clamp collar 102 and through the circular wall 126 on both sides of the clamp collar gap 118. The clamp collar bolt 120 threadably engages the clamp collar bolt threaded opening 124 such that, when the clamp collar bolt 120 is tightened, the clamp collar gap 118 space decreases and the collar is pulled to center itself on the cylindrical extension 104. In another embodiment, the clamp collar 102 consists of two half circles that each have two clamp collar bolt threaded openings 124 so that they can be connected by two clamp collar bolts 120 to secure the shaft. In another embodiment, the clamp collar 102 has a hinge that is located on the opposite side of the clamp collar 102 from the clamp collar gap 118.

Additionally, FIGS. 5 and 6 depict a plurality of tabs 106 on the cylindrical extension 104 and two threaded openings 114. The plurality of tabs 106 is formed such that the individual tabs are symmetrically arranged around the entire periphery of the cylindrical extension 104. As shown, each of the plurality of tabs 106 extends equally over a respective segment of the inner periphery of the cylindrical extension 104. Each threaded opening 114 extends through the circular wall 126 of the clamp collar 102 in a radial direction so that a threaded member 116 extends through each threaded opening 114 to abuttably and releasably contact a respective tab 107 from the plurality of tabs 106. In an embodiment, the plurality of tabs 106 is flexible or at least elastically deformable so that it bends when urged against the shaft to apply a holding force in the form of friction between the shaft and each tab 107. In the illustrated embodiments, when a threaded member 116 is threadably engaged within the threaded opening 114 and extends such that a tip of the threaded member 116 extends radially inwardly past the inner periphery of the circular wall 126, the tip makes contact with one tab 107 of the plurality of tabs 106 and applies a biasing force on the one tab 107 of the plurality of tabs 106 in the radial direction towards the shaft when the shaft is disposed in the inner race 110. This biasing force pushes the tab 107 against the shaft to secure the inner race 110 on the shaft in both the radial and axial directions. It is noted that the large surface area of contact between the tab 107 and the shaft avoids damage to the shaft as the contact pressure between the tab 107 and the shaft is selected to be below an elastic limit of the shaft material. The biasing force causes the tab 107 to bend inward towards the center of the cylindrical extension 104. When the shaft is engaged within the cylindrical extension 104, the biasing force causes the tab 107 to apply a biasing force to the shaft so that the shaft is positioned to be closer to collinear with the centerline of the inner race 110 thereby decreasing the vibration of the bearing assembly 100 during operation, especially when more than one tab 107 are arranged symmetrically around a section of the shaft and are tightened in succession, for example, in a star pattern.

Figure 7:
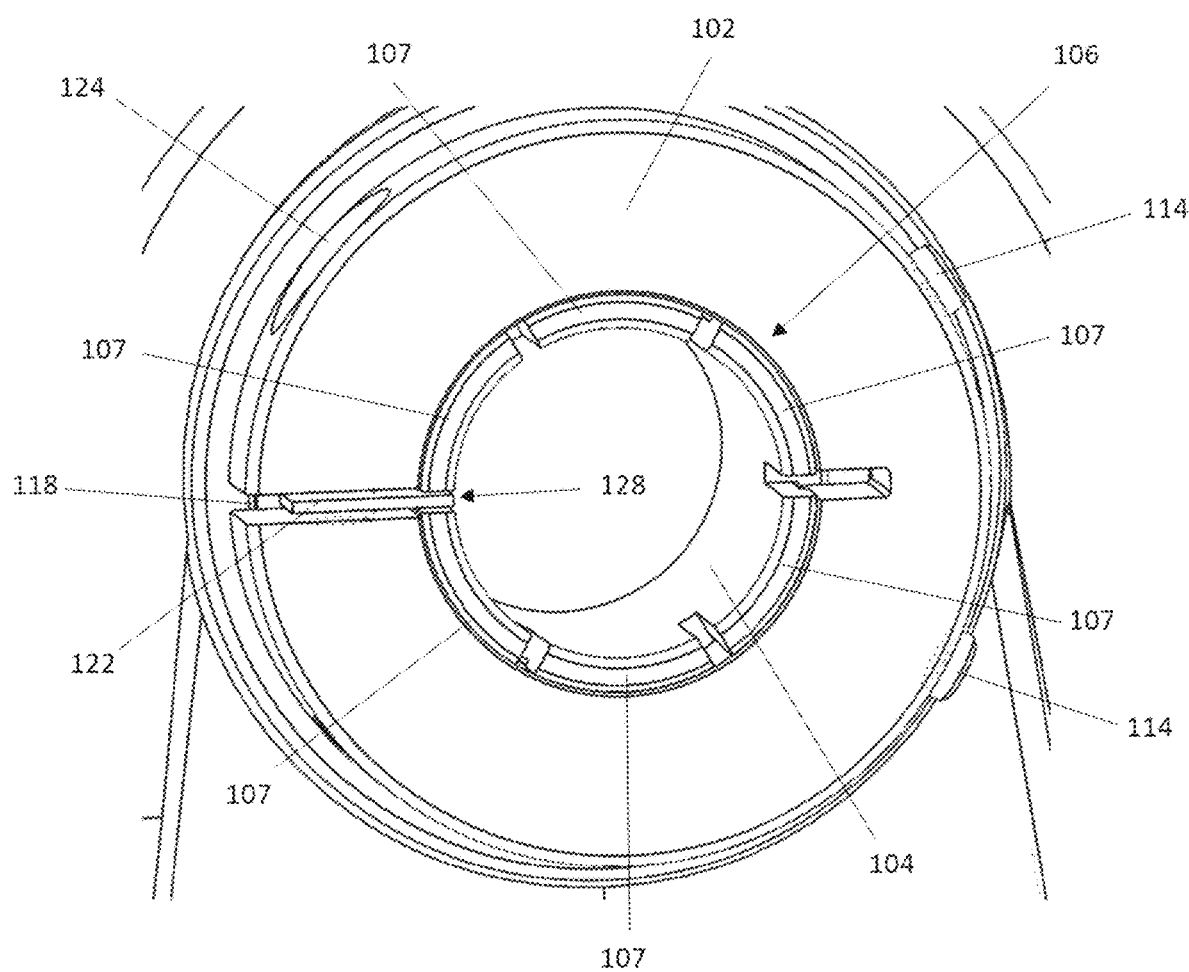
FIG. 7 is a perspective view of a clamp collar in use with a clamp collar key according to aspects of the present disclosure.

FIG. 7 is a perspective view of a clamp collar 102 in use with a clamp collar key 122 installed into the clamp collar gap 118. The clamp collar key 122 slides into the gap 128 between two tabs 107 of the plurality of tabs 106 from the cylindrical extension 104 to align the one or more threaded openings 114 and one or more threaded members 116 with the center of each respective tab 107 from the plurality of tabs 106. In other embodiments, instead of or in addition to the clamp collar key 122, a rolled dowel pin which is mechanically retained into the claim collar 102 is used or a radial clocking mechanism is used to align the one or more threaded openings 114 and one or more threaded members 116 with the center of each respective tab 107 from the plurality of tabs 106. By aligning the one or more threaded openings 114 and the one or more threaded members 116 with the center of each respective tab 107 from the plurality of tabs 106, the biasing force applied by each of the one or more threaded members 116 on each respective tab 107 from the plurality of tabs 106 is applied evenly across each respective tab 107 from the plurality of tabs 106 that are contacted by threaded members 116 to promote an even pressure on the shaft when the biasing force is applied on the tabs 107.

Figure 8:
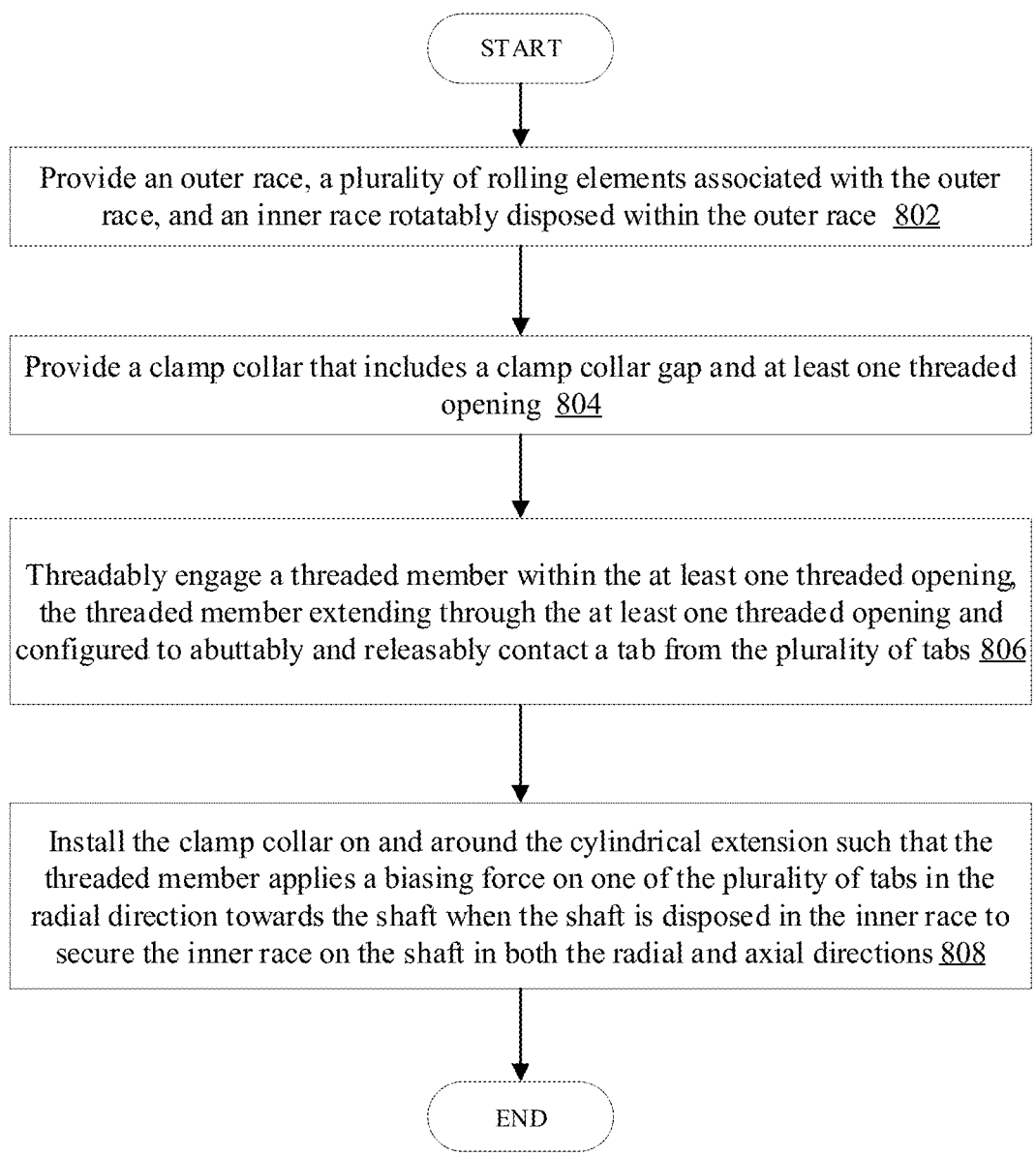
FIG. 8 is a flowchart for a method of assembling a bearing with a threaded member shaft clamp collar according to aspects of the present disclosure.

FIG. 8 is a flowchart for a method of assembling a bearing with a threaded member shaft clamp collar for uniform shaft holding pressure. In accordance with the method, the method begins at step 802 by providing an outer race, an inner race, and a plurality of rolling elements disposed between the inner and outer races that rotatably support the inner race relative to the outer race. In an embodiment, the outer race, inner race, and the plurality of rolling elements are made from metal, but other materials may be used. The plurality of rolling elements is disposed and symmetrically arranged between the inner race and outer race. The inner race is adapted to receive a shaft therein. The inner race includes a cylindrical extension forming a plurality of tabs symmetrically arranged around an entire periphery of the cylindrical extension. Each tab from the plurality of tabs extends equally over a respective circular segment of the cylindrical extension. As discussed above, in an embodiment, the plurality of tabs is only formed on one end of the cylindrical extension. In another embodiment, the plurality of tabs is formed at both ends of the cylindrical extension. In yet another embodiment, one or more tab of the plurality of tabs is/are flexible or elastically deformable.

At step 804, a clamp collar having a generally annular, C-shaped wall that includes a clamp collar gap and at least one threaded opening is provided. In one embodiment, the clamp collar has a circular wall without a collar gap, as discussed above. In other embodiments, the clamp collar consists of two half circles that each have two clamp collar bolt threaded openings so that they can be connected by two clamp collar bolts to secure the shaft or the clamp collar has a hinge that is located on the opposite side of the clamp collar from the clamp collar gap, as discussed above. In an embodiment, the clamp collar is made from metal, but other materials such as a thermoplastic material may also be used. The clamp collar has a generally annular shape defined by a circular wall that has an inner and outer circumference, e.g., along a longitudinal axis of the shaft on which it is installed, a height in a radial direction, and an optional clamp collar gap extending radially through the circular wall. The clamp collar gap has a thickness that separates the circular wall at a location. At least one threaded opening may extend radially through the height of the circular wall of the clamp collar. The threaded opening has an inner and outer opening as defined by the height of the circular wall of the clamp collar. The outer opening of the threaded opening extends through the surface of the outer circumference of the circular wall and the inner opening extends through the surface of the inner circumference of the circular wall. In an embodiment, there are more than one threaded opening formed through the clamp collar, in which case the threaded openings can be symmetrically spaced around the circular wall of the clamp collar. For example, there may be two, three, or four threaded openings that may be spaced 180-, 120-, or 90-degrees respectively from each other on the circular wall. In other embodiments, there can be more or than four or fewer than one threaded openings that are symmetrically spaced around the circular wall of the clamp collar. In one embodiment, the number of threaded openings matches the number of tabs in the cylindrical extension. Additionally, in an embodiment, a clamp collar bolt threaded opening is included in the circular wall of the clamp collar. The clamp collar bolt threaded opening extends tangentially through an inner opening of the clamp collar through the circular wall on both sides of the clamp collar gap. Positioning of the threaded openings may also depend on a location of the clamp collar gap such that the threaded opening(s) are symmetrically distributed about a diameter of the clamp collar that includes the clamp collar gap and are symmetrically arranged at radial locations that are generally opposite the clamp collar gap.

At step 806, a threaded member threadably engages within a threaded opening. The threaded member extends through the threaded opening and is configured to abuttably and releasably contact a respective tab from the plurality of tabs. In an embodiment, this step is repeated for additional threaded openings and threaded members where a separate threaded member threadably engages within a separate threaded opening and extends through the respective threaded opening and is configured to abuttably and releasably contact a respective tab from the plurality of tabs. Tightening of the threaded members may follow the tightening of the collar bolt, if present, to first secure the collar around the cylindrical extension.

At step 808, the clamp collar is installed on and around the cylindrical extension. A clamp collar key installs into the clamp collar gap and a gap between two of the plurality of tabs to align the threaded member with the center of one of the plurality of tabs from the cylindrical extension. In an embodiment, if there are more than one threaded openings and threaded members, the installation of the clamp collar key will align each of the threaded members with the center of a respective tab from the plurality of tabs. By aligning the one or more threaded openings and one or more threaded members with the center of each tab from the plurality of tabs, the biasing force applied by the one or more threaded members on each respective tab from the plurality of tabs is applied evenly across each respective tab from the plurality of tabs that are contacted by the one or more threaded members to promote an even pressure on the shaft when the biasing force is applied on the tabs. Additionally, this also secures the inner race on the shaft in both the radial and axial directions and puts the centerline of the shaft to being closer to collinear with the centerline of the inner race, thereby decreasing the vibration of the bearing assembly during operation.

By using the bearing assembly and applying biasing force to the shaft in the manner described in the present disclosure, greater holding power for the shaft is achieved than with using a collar that does not have the threaded openings 114 (as shown, e.g., in FIG. 3), but without causing any damage to the shaft because the threaded members do not directly contact the shaft. Rather, the threaded members press against tabs, which distribute the load over a larger area of the shaft. Further, local stress concentration between the threaded member and the shaft is avoided, and static friction between the tabs and shaft is increased both due to the larger area of contact as well as the increased pressing force that pushes the tabs against the shaft. The higher holding power of the bearing assembly allows for higher shaft concentricity than previous bearing shaft attachments. For example, the bearing assembly of the present disclosure provides a 90-110% increase in holding power compared to clamp collar holding power designs (and a 60-75% increase in holding power compared to setscrew holding power design).

The use of the terms "a" and "an" and "the" and "at least one" and similar references in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A bearing assembly, comprising:
an outer race;
a plurality of rolling elements associated with the outer race;
an inner race rotatably disposed within the outer race such that the plurality of rolling elements is disposed between the inner and outer races, the inner race adapted to receive therein a shaft, the inner race including a cylindrical extension forming a plurality of tabs symmetrically arranged around an entire periphery of the cylindrical extension, the cylindrical extension adapted to engage the shaft;
a clamp collar having an annular shape defined by a circular wall, the circular wall having a thickness in an axial direction and a height in a radial direction;
at least one threaded opening extending radially through the height of the circular wall, the at least one threaded opening having inner and outer openings defined on the circular wall;
a threaded member threadably engaged within the at least one threaded opening, the threaded member extending through the at least one threaded opening and configured to abuttably and releasably contact a tab from the plurality of tabs; and a clamp collar key configured to slide into a gap between two of the plurality of tabs to align the threaded member with a center of one of the plurality of tabs, wherein the clamp collar is installed on and around the cylindrical extension such that the threaded member applies a biasing force on one of the plurality of tabs in the radial direction towards the shaft when the shaft is disposed in the inner race to secure the inner race on the shaft in both the radial and axial directions.

2. The bearing assembly of claim 1, wherein each of the plurality of tabs extends equally over a segment of an inner periphery of the cylindrical extension.

3. The bearing assembly of claim 1, wherein the plurality of rolling elements is symmetrically arranged between the inner and outer races.

4. The bearing assembly of claim 1, further comprising:
a clamp collar gap extending radially through the circular wall, the clamp collar gap having a clamp collar gap thickness that is tangential to the circular wall;
a clamp collar bolt threaded opening extending tangentially through an inner opening of the clamp collar through the circular wall on both sides of the clamp collar gap; and
a clamp collar bolt that threadably engages within the clamp collar bolt threaded opening to decrease the clamp collar gap thickness.

5. The bearing assembly of claim 4, wherein the at least one threaded opening comprises a plurality of threaded openings that are symmetrically spaced around the clamp collar in an area opposite the clamp collar bolt threaded opening.

6. The bearing assembly of claim 4, wherein the threaded member and the clamp collar bolt have a socket size that is the same.

7. The bearing assembly of claim 1, wherein the at least one threaded opening comprises two threaded openings, and wherein a separate threaded member threadably engages with each of the two threaded openings.

8. The bearing assembly of claim 1, wherein the at least one threaded opening comprises three or four threaded openings, and wherein a separate threaded member threadably engages with each of the three or four threaded openings.

9. A method of rotatably supporting a shaft, comprising:
providing a bearing assembly, the bearing assembly including:
an outer race,
a plurality of rolling elements associated with the outer race, and
an inner race rotatably disposed within the outer race such that the plurality of rolling elements is disposed between the inner and outer races, the inner race adapted to receive therein a shaft, the inner race including a cylindrical extension forming a plurality of tabs symmetrically arranged around an entire periphery of the cylindrical extension, the cylindrical extension adapted to engage the shaft;
providing a clamp collar, the clamp collar having an annular shape defined by a circular wall, the circular wall having a thickness in an axial direction and a height in a radial direction, the clamp collar including:
at least one threaded opening extending radially through the height of the circular wall, the at least one threaded opening having inner and outer openings defined on the circular wall;
sliding a clamp collar key into a gap between two of the plurality of tabs to align a threaded member with a center of one of the plurality of tabs;
threadably engaging the threaded member within the at least one threaded opening, the threaded member extending through the at least one threaded opening and configured to abuttably and releasably contact a tab of the plurality of tabs; and
installing the clamp collar on and around the cylindrical extension such that the threaded member applies a biasing force on one of the plurality of tabs in the radial direction towards the shaft when the shaft is disposed in the inner race to secure the inner race on the shaft in both the radial and axial directions.

10. The method of claim 9, wherein each of the plurality of tabs extends equally over a segment of an inner periphery of the cylindrical extension.

11. The method of claim 9, wherein the plurality of rolling elements is symmetrically arranged between the inner and outer races.

12. The method of claim 9, wherein the providing of the clamp collar further includes a clamp collar gap extending radially through the circular wall, the clamp collar gap having a clamp collar gap thickness that is tangential to the circular wall, and a clamp collar bolt threaded opening extending tangentially through an inner opening of the clamp collar through the circular wall on both sides of the clamp collar gap, the method further comprising threadably engaging a clamp collar bolt within the clamp collar bolt threaded opening to decrease the clamp collar gap thickness.

13. The method of claim 12, wherein the at least one threaded opening comprises a plurality of threaded openings that are symmetrically spaced around the clamp collar in an area opposite the clamp collar bolt threaded opening.

14. The method of claim 12, wherein the threaded member and the clamp collar bolt have a socket size that is the same.

15. The method of claim 9, wherein the at least one threaded opening comprises two threaded openings, and wherein a separate threaded member threadably engages with each of the two threaded openings.

16. The method of claim 9, wherein the at least one threaded opening comprises three or four threaded openings, and wherein a separate threaded member threadably engages with each of the three or four threaded openings.

17. The method of claim 9, wherein the applying of the biasing force by the threaded member on the one of the plurality of tabs places a centerline of the shaft closer to being collinear with a centerline of the inner race, thereby decreasing vibration of the bearing assembly during operation.

* * * * *